United States Patent

Merritt, II

[11] Patent Number: 5,962,053
[45] Date of Patent: Oct. 5, 1999

[54] EDIBLE FILM AND METHOD

[75] Inventor: Frederick Maynard Merritt, II, Lockport, Ill.

[73] Assignee: Viskase Corporation, Chicago, Ill.

[21] Appl. No.: 09/024,654

[22] Filed: Feb. 17, 1998

[51] Int. Cl.⁶ .............................. A23L 1/31; A23L 1/05
[52] U.S. Cl. .............. 426/138; 426/277; 426/573; 426/575; 426/576; 426/578
[58] Field of Search ................... 426/138, 277, 426/573, 575, 576, 578, 519

[56] References Cited

U.S. PATENT DOCUMENTS

| | | | |
|---|---|---|---|
| 4,375,481 | 3/1983 | Kuwabara et al. | 426/93 |
| 4,851,394 | 7/1989 | Kubodera | 514/54 |
| 5,049,401 | 9/1991 | Harada et al. | 426/573 |
| 5,308,636 | 5/1994 | Tye et al. | 426/573 |
| 5,366,671 | 11/1994 | Kimura | 264/28 |
| 5,558,861 | 9/1996 | Yamanaka et al. | 424/93.7 |
| 5,690,981 | 11/1997 | Watanabe et al. | 426/531 |
| 5,695,800 | 12/1997 | Merritt, II | 426/277 |

OTHER PUBLICATIONS

Brochure FMC Corporation, Food Ingredients Division, Nutricol® Konjac General Technology, 1993.

*Primary Examiner*—Nina Bhat
*Attorney, Agent, or Firm*—Roger Aceto

[57] ABSTRACT

Described is an edible, water insoluble film which is a blend of polysaccharide and protein and, in particular, a ternary blend of konjac flour as a major constituent, agar and gelatin. Also, described is a method of forming the film including a deacetylating step to insolubilize the konjac flour.

15 Claims, 1 Drawing Sheet

EDIBLE FILM AND METHOD

TECHNICAL FIELD

The present invention relates to an edible film which can serve as a replacement for collagen. More particularly, the present invention relates to a stand-alone edible film having sufficient wet strength to function as a collagen replacement in the production of sausages and the like.

BACKGROUND OF THE INVENTION

Collagen commonly is used as an edible film in some food processing applications. For example, collagen casings are used in the packaging of various kinds of sausages such as in the stuffing of fresh pork sausages and the like. Collagen also can be coextruded with the sausage such that a collagen casing is formed directly on the sausage product. In still other applications, collagen sheets are used to wrap whole meat muscles, such as whole hams, for processing and storage. Collagen used in sausage production generally is consumed with the food product as opposed to cellulose casings, for example, which are removed prior to the ingestion of the sausage.

Other edible films currently available are made from a variety of polysaccharides, vegetable proteins and lipids. Various polysaccharides used in edible films include alginate, pectin, carrageenan and starches among others. Proteins, other than collagen, used in making films or coatings for foodstuffs include gelatin (derived from collagen), casein and albumin and various vegetable proteins such as wheat and corn gluten and soy. Lipid films primarily employed as coatings, include fatty acid glycerides and various waxes such as paraffin and beeswax.

U.S. Pat. No. 3,687,661 describes an edible vegetable protein casing comprising a protein derived from corn, peanuts, wheat or soy beans which is extruded, coagulated and formed by contact with, for example, aluminum sulfate or an aldehyde.

U.S. Pat. No. 5,084,307 discloses a film composed of a water soluble polysaccharide (such as carrageenan), a polyhydric alcohol and water disposed on a sub film composed of an alkali metal salt of casein, soybean protein and gelatin.

U.S. Pat. No. 5,543,164 discloses forming a coating on a food product, the coating being a denatured protein selected from milk proteins, whey proteins, casein, wheat proteins, soy proteins, ovalbumin, corn zein, peanut proteins and keratin; lipids selected from fatty acid esters, fatty alcohols, waxes, monoglyerides and triglycerides; and a plasticizer selected from glycerol, sorbitol and polyethylene glycol.

WO 92/01394 discloses a film which is a blend of an edible protein and an edible polysaccharide, the film being coated with an edible hydrophobic material such as an edible oil or wax.

One polysaccharide which has been employed to make an edible film is glucomannan. Glucomannan may be described as a polysaccharide derived from the corns of the Amorphophallus konjac plant which has been put to a wide variety of uses. For example, it is used as a food source in the Orient. The FMC Corporation provides a purified glucomannan or konjac flour under the trademark NUTRICOL®. Literature provided by FMC describes a method for forming a film of the NUTRICOL® konjac flour.

U.S. Pat. No. 5,695,800, in one embodiment, describes a method of casting a glucomannan film directly onto a food product. The method, in particular, involves casting a solution of the konjac flour onto the surface of the food, deacetylating the solution with a saturated salt solution with a pH other than neutral to form an insoluble gel, drying the salt-containing gel to form a film and then washing the salt from the film and redrying it. In a second embodiment, a stand-alone film is formed by a similar method only using a sac-free konjac flour.

EP 273,069 discloses a composition for use in making an edible film comprising a mixture of glucomannan, a second polysaccharide and glycerine.

EP 709,039 discloses forming a film from a thermoplastic starch mixed with a protein, preferably gelatin, casein or wheat protein and a crosslinking agent.

While attempts have been made to find a suitable replacement for edible collagen, collagen still remains a material of choice for a stand-alone film for use in food processing given its cost and physical properties. For example, as noted above, U.S. Pat. No. 5,695,800 discloses a stand-alone glucomannan film. However, this film is made with a sac-free konjac flour which is difficult to obtain and its physical properties, such as wet strength, are inferior to those of collagen. In this respect, to be considered a suitable replacement for collagen, the film should at least have a wet tensile strength and percent elongation at break comparable to the equivalent edible collagen film.

Accordingly, one object of the present invention is to provide an edible film which is a suitable replacement for collagen in the manufacture of food products.

Another object is to provide a collagen replacement film which is a blend of polysaccharide and protein.

A further object is to provide such a film wherein the polysaccharide is a blend including glucomannan.

Yet another object is to provide such a film where a major constituent is a commercial, sac-containing glucomannan flour.

A further object is to provide a method for making a stand-alone film comprising a blend of polysaccharide and protein which is a suitable replacement for edible collagen in the processing of food products.

SUMMARY OF THE INVENTION

The film of the present invention is a ternary polymer comprising konjac flour (glucomannan), agar and gelatin. As disclosed in U.S. Patent No. 5,695,800, konjac flour has been used to form a film wherein a solution of the flour is cast then deacetylated to coagulate the konjac and then dried. As noted in the '800 Patent, the process was most useful in a coextrusion process wherein the film is formed in situ on a food product. This is because the sac-containing konjac flour commercially available from the FMC Corporation under the trademark NUTRICOL® was not able to form a stand-alone film. For purposes of a stand-alone film, the flour had to be further refined to remove the sac.

In the context of the present invention however, the commercially available konjac flour is used. The konjac flour is present as a majority component and functions as the basic film forming medium in the ternary polymer system of the invention. The konjac component, after it is deacetylated, is insoluble in water which is an essential film property.

A second component of the film is agar. Agar or agar-agar is a seaweed extract having the ability to form strong gels. It is soluble in boiling water and forms gels at low concentrations. Moreover, the gels formed by agar are unique in that gelation occurs at temperatures below the gel-melting temperature. For example, an agar gel formed by cooling and congealing an agar solution, can be reheated to well above the gelling temperature before reliquification occurs.

Since agar forms a gel at temperatures higher than konjac, it is an important component of the film. In this respect, the agar is first to gel as the ternary mixture cools. This gelation is sufficient to provide some coherency or "body" to the mixture. Thus, the agar forms a matrix for holding the other components as the mixture cools and then is reheated to dry the mixture. Preferably, the agar forms at least 22% by weight of the three components and may be included in equal parts with the konjac.

The third component is gelatin. The gelatin, preferably, is present in minor amounts and less than the amount of agar. The gelatin is a protein constituent which adds strength to the film structure. One possible theory as to the function of the gelatin in the ternary system is that it provides a crosslinking mechanism that holds the gelatin molecules to each other and to the polysaccharide molecules of the konjac and agar. For example, it is speculated that there is hydrogen bonding between the gelatin and the polysaccharide molecules.

Thus, as the three-component mixture cools, the agar first sets up as a gel which provides a matrix to hold the other components. Upon further cooling, the konjac flour gels and subsequent curing deacetylates the konjac such that the entire ternary system is rendered water insoluble to provide a self supporting film having wet strength properties at least equal to those of collagen. The gelatin provides a crosslinking mechanism to hold the components together.

The film preferably is, by weight 42.5 to 60% konjac flour, 22 to 42.5% agar and 15 to 25% gelatin. In this blend, it is preferred that konjac flour is the majority component and that the amount of agar is greater than the amount of gelatin.

In the method of the present invention, the two polysaccharide polymers, konjac flour and agar, and the protein polymer, gelatin, are mixed together as dry powders. The proportions are generally 42.5 to 60 wt. % konjac flour, 22 to 42.5 wt. % agar and 15 to 25 wt. % gelatin with a target or preferred blend being a 48:32:20 ratio of konjac:agar::gelatin.

The blend is mixed with water under reflux until total dissolution occurs. It is preferred that enough of the dry blend is added to the hot water to provide a total solids content of at least 3%. A higher solids content of 10 to 12% is preferred with 14 to 16% appearing to be an upper limit due to equipment limitations and the difficulty of solublizing the mixture.

Once complete dissolution has occurred, a softening agent such as glycerine is added. The solution then is cast or extruded as a film onto a support surface and is allowed to cool.

In cooling, the agar component causes the solution to set up into a firm gel. The gel then is dried to a total moisture content of about 6 to 7%. This causes the gel structure to collapse which decreases the spacing between the polymer molecules and allows hydrogen bonding to occur between molecules. At this point, it also speculated that a mechanical bonding occurs by means of the collagen folds in the gelatin and by the intertwining of molecules. The resulting structure is a dry intermediate film which then is cured by further processing.

Curing the film is accomplished by contacting the dry intermediate film with a salt-containing bath at a pH other than neutral. While the salt bath rehydrates the dry intermediate film, the concentration of the salt limits the amount of rehydration. The pH of the bath deacetylates the konjac making it insoluble. The film, now insoluble and partly hydrated, is dried a second time to complete the cure process. The dried film then is washed to remove salt and is dipped in a plasticizing solution such as a 2 to 5% glycerine solution. The glycerine softens the film and provides flexibility when the film is dried. Accordingly, the washed and glycerine-containing film is dried a third time to about 5 to 12% moisture to provide the edible, self-supporting film of the present invention.

A film formed in this fashion is found to have properties which make it a suitable replacement for collagen in certain applications. In this respect, a collagen replacement film useful for food processing applications should be edible and water insoluble. The film also should have physical properties at least comparable to commercial collagen films. For example, one commercial collagen sheet has an average wet tensile strength of about 0.7 kg/mm$^2$ and an elongation to break of about 55%. The tensile strength, as noted, is the average of the machine direction (MD) and transverse direction (TD) tensile strength or (MD+TD) /2. A commercial collagen casing as made by several manufactures has an average wet tensile strength of about 0.8 kg/mm$^2$ and an elongation at break of 48%.

Thus, a film in accordance with the present invention may be characterized in one aspect as a self-supporting edible film comprising a water insoluble mixture of konjac flour, agar and gelatin; a polyol plasticizer; and water.

In another aspect, the invention may be characterized as a self-supporting edible film comprising:
a) 40 to 70% of a water insoluble mixture including by weight of the mixture
   i) 42.5 to 60% konjac flour
   ii) 22 to 42.5% agar
   iii) 15 to 25% gelatin;
b) 20 to 40% polyol plasticizer; and
c) 5 to 12% water; Preferably, the film has an average wet tensile strength of at least 0.7 kg/mm$^2$ and an elongation break of at least 55%.

To form such a film, the method of the present invention may be characterized by the steps of:
a) dry blending konjac flour, agar and gelatin;
b) dissolving the blend in refluxing water containing glycerine to prepare a dough;
c) casting the dough to a sheet and cooling to form a gel;
d) drying the gel to form an uncured intermediate film;
e) contacting the uncured intermediate film with a saturated salt solution at a pH other than neutral to deacetylate the konjac flour thereby forming a salt-containing water insoluble film;
f) drying the salt-containing water-insoluble film;
g) washing the water insoluble film to form a salt-free film;
h) plasticizing the salt-free film; and
i) drying the salt-free film to provide a stand-alone film comprising 40 to 70wt. % of the konjac:agar:gelatin blend, 20 to 40 wt. % plasticizer and 5 to 12 wt. % water.

DESCRIPTION OF THE DRAWING

The sole FIGURE is a schematic representation showing steps of a process for forming a stand-alone edible film in accordance with the method of the present invention.

DETAILED DESCRIPTION OF THE INVENTION

Figure 1:
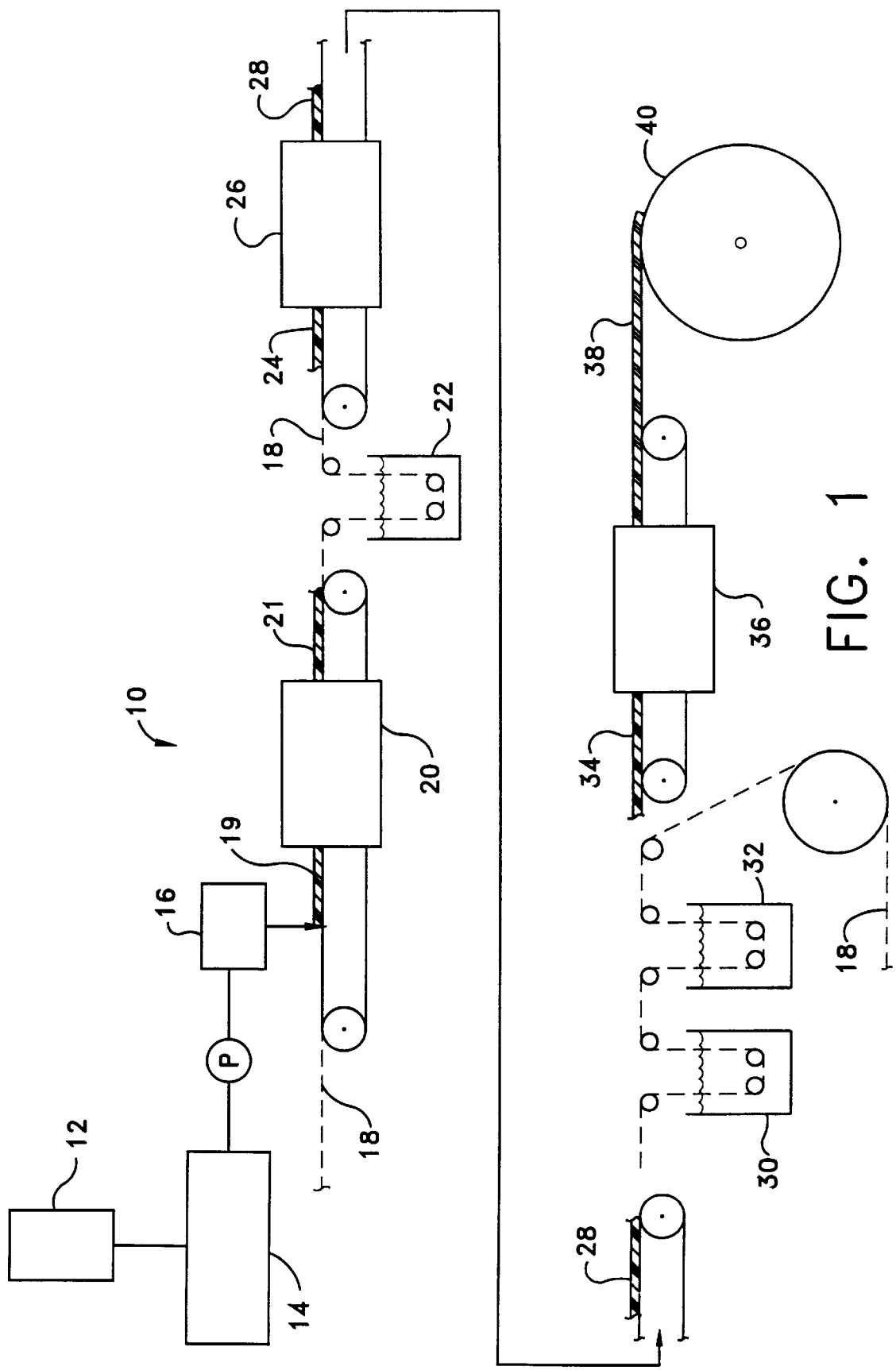

Referring to the drawing, the FIGURE shows a system generally indicated at 10. The system includes a powder mixer 12 for blending the dry ingredients of the film composition namely, konjac flour (glucomannan) agar and gelatin. This dry powder mixture then is fed to a steam heated reactor 14 having a plough-type stirrer. In the reactor, the dry powder is mixed with water and glycerine until the powder mixture is dissolved. The preferred sequence, generally, is to start by heating the water in the reactor to about 45° C. Then the powdered polymer blend is dispersed by sifting it into the water. The temperature is raised to reflux the mixture and the stirrer operated until there is complete dissolution of the polymer blend. The solution, which may have a dough-like consistency, is pumped to a slot die 16. While tubular extrusion is possible, the present invention is described in the context of sheet extrusion. Accordingly, the solution fed to the die 16 is extruded onto a conveyor support web 18 and gels to form a layer 19 about 0.25 to 1.5 mm thick. The support web transports the gel through an initial drier 20.

In drier 20, the gel is dried to form an uncured intermediate film 21. The support then transports the uncured film through a deacetylating bath 22. This bath is a concentrated salt solution having a high pH. A preferred bath concentration is a 26% NaCl solution with 0.5% NaOH to increase the pH. The high pH causes deacetylation of the konjac and the concentrated salt solution acts to limit the reabsorption of water by the gel.

In the salt bath 22, the uncured film is rehydrated and the konjac is deacetylated and rendered insoluble so the extrusion now forms a rehydrated salt-containing and water-insoluble film 24 on the conveyor support web 18. Also, in the bath, some of the glycerine which was added in the stirrer 14 is washed from the film.

The support web 18 next carries the salt-containing film 24 through a second drier 26 which dries down the film to complete the cure and form a dried salt-containing film 28. Next the support web transports the dry salt-containing film 28 through a wash tub 30 where salt is washed from the film and then through a tank 32 containing an aqueous plasticizer such as a 5% glycerine solution. Upon leaving the tank 32, the film 34 now rehydrated and plasticized is removed from the support web 18. The film now is dried a third time in drier 36 which lowers the total moisture content to 5 to 12% of total weight. This cured, plasticized film, as indicated at 38, is then wound on a reel 40 for use or further processing such as, for example, printing, irradiating, coating and conversion to individual sheets or tubes.

In one application of the system as described above, the powder blend of polymers comprise 6.72 parts konjac, 4.48 parts agar and 2.8 parts gelatin. These polymers are dry blended and sifted into stirred water which is heated to reflux at 100° C. for one hour. Glycerine is added to facilitate mixing and dissolution of the powders. A doughy paste having a solid content of 14% is produced in the stirrer and this material is extruded. The extruded material is dried to bring the solids and glycerine content up to about 79%. The material then is exposed to the salt solution which deacetylates the konjac flour, rehydrates the extruded material and washes out the glycerine. The deacetylated material, which contains salt from the salt bath, is dried a second time to increase the solids content to about 94%, the ratio of polymer-to-salt in the dried material being about 63:37. A second washing step removes the salt. The resulting salt and glycerine-free film is then plasticized by contacting with a 5% glycerine solution and dried a third time to provide a film comprising by weight about 59% solids, 35% glycerine and 6% water wherein the solids content comprises konjac, agar and gelatin in a ratio of about 48:32:20.

Tests were performed to establish various parameters of the present invention. The test method used to prepare films was similar to the method described above. However, the method was modified as noted below to accommodate laboratory scale.

The test materials included a konjac flour GP312 sold by FMC Corporation under the trademark NUTRICOL®. The manufacturing trade literature identifies GP312 as being a general purpose gelling combination of konjac and carrageenan. It is believed the carrageenan is a minor constituent to improve the rheology of konjac solutions and otherwise does not contribute to the physical properties of the film of the present invention.

The agar used was CAS#9002-18-0 obtained from Colony Industries.

Various gelatins were used including a Knox gelatin, Leiner Davis type 250B and an IPC Protein Colloid Ag 4380. The latter is not a food grade so it is used for lab testing only. The Ag 4380 gelatin is identified by the manufacturer as a collagen protein hydrolysate which is soluble in water.

In the laboratory tests, mixing was done in a beaker placed in an oil bath for heating. The general procedure followed to make the test films was as follows:

1. Dry blend the three polymers.
2. Add water to a beaker and preheat the oil bath to 45° C.
3. Start the stirrer, sift the polymer blend into the edge of the vortex and cover with foil to minimize evaporation.
4. The temperature of the oil bath is raised to 112° C. and the mixture is brought to a boil in about 15 minutes. Boiling continues for about 30 minutes to achieve complete dissolution.
5. Glycerin is added and stirring continued for another 5 minutes.
6. The batch is sampled to determine its viscosity. The Brookfield viscosity of the sample is tested with a No. 4 spindle at 6 ppm. The target viscosity being about 35–50 M cps at 85° to 90° C.
7. The resulting dough mixture is quickly hand cast to a film about 1.4 mm thick before it has cooled enough to gel.
8. The dough is cooled to a gel and then is placed onto a 7.6 to 10.2 cm diameter embroidering hoop.
9. The gel is dried at 65° C. for about 30 to 33 minutes to a target moisture of about 3 to 6% of total weight to form an uncured film.
10. The uncured film is dipped in a cure bath of 26% NaCl and 0.5% NaOH for 30 seconds and redried for another 3 to 5 minutes at 65° C. to form a cured, salt-containing film.
11. The salt-containing film is washed in warm water to wash out the salt.
12. The washed film is dipped in a 2.5% glycerine solution for 5 minutes and redried to a target moisture of about 6% of total weight.

The film, as prepared above, is tested for tensile strength and percent elongation at break both dry and rewetted. For dry tensile strength and percent elongation the samples are equilibrated in a 50% relative humidity environment and tested immediately. The sample also is tested and rewet after soaking in water for up to 30 minutes. Samples to be tested are cut to a size measuring 25.4 mm wide by 50 to 75 mm long and are tested on an Instron having its jaws set 25.4 mm apart and its crosshead speed set at 50.8 mm/min.

For purposes of use as a collagen replacement, the wet tensile strength should be at least .6 kg/mm$^2$ or better with .7 kg/mm$^2$ or better being preferred. An elongation to break off at least 55% or better also is preferred as these tensile strength and elongation values are comparable to collagen films.

A series of lab tests using the procedure noted above were conducted to determine the effects on the ternary system of using various amounts of the konjac, agar and gelatin polymers. The results are reported in Table I below.

TABLE I

THREE COMPONENT FILM PROPERTIES

| Sample* | | Weight (gms) in Mix | | | Final Mix | | 50% RH | | | Rewet | | |
|---|---|---|---|---|---|---|---|---|---|---|---|---|
| K/A/G | No. | Konj | Agar | Gelatin | % Total Solids | Visc (95° C.) | mils | kg/mm$^2$ | % elong | mils | kg/mmm$^2$ | % elong |
| | Control | 1.8 | 1.2 | 0 | 3 | 33500 | 0.7 | 12.1 | 36 | 1.2 | 0.35 | 92 |
| 58.7/39.3/2 | 1 | 1.76 | 1.18 | 0.06 | 3 | 27000 | 0.8 | 8.8 | 26 | 1.2 | 0.23 | 47 |
| 54/36/10 | 2 | 1.62 | 1.08 | 0.3 | 3 | 23000 | 0.8 | 6.7 | 18 | 1.2 | 0.34 | 110 |
| 48/32/20 | 3 | 1.44 | 0.96 | 0.6 | 3 | 17000 | 0.8 | 6.4 | 16 | 1.2 | 0.37 | 137 |
| 42.5/42.5/15 | 4 | 1.28 | 1.28 | 0.45 | 3 | 10700 | 0.8 | 12.8 | 28 | 1.3 | 0.39 | 89 |
| 59.5/25.5/15 | 5 | 1.79 | .77 | .45 | 3 | 24200 | 0.7 | 9.9 | 18 | 1.2 | .23 | 50 |
| 52.5/22.5/25 | 6 | 1.58 | .68 | .75 | 3 | 10600 | 0.7 | 11.1 | 17 | 0.9 | .47 | 138 |
| 48/32/20 | 7 | 1.92 | 1.28 | 0.8 | 4 | 15550 | 1.0 | 8.2 | 18 | 1.3 | 0.50 | 141 |
| 48/32/20 | 8 | 1.92 | 1.28 | 0.8 | 4 | — | 0.9 | 10.9 | 19 | 1.3 | 0.6 | 118 |
| 32/64/40 | 9 | 1.44 | 0.96 | 1.6 | 4 | 12075 | 1.0 | 6.6 | 15 | 1.3 | 0.19 | 0 |
| 48/32/20 | 10 | 1.92 | 1.28 | 0.8 | 4 | 58700 | 0.9 | 12.7 | 26 | 1.1 | 0.63 | 98 |
| 48/32/20 | 11 | 1.92 | 1.28 | 0.8 | 4 | 28300 | 0.9 | 10.3 | 20 | 1.10 | 0.57 | 125 |
| 42.5/42.5/15 | 12 | 2.13 | 2.13 | .75 | 5 | 67400 | 1.1 | 10.9 | 27 | 1.5 | 0.42 | 85 |
| 37.5/37.5/25 | 13 | 1.88 | 1.88 | 1.25 | 5 | 26700 | 1.2 | 11.7 | 20 | 1.4 | 0.54 | 143 |

*Samples 1–4 and 7–13: hydrolyzed collagen
Sample 5: knox gelatin
Sample 6: Leiner Davis gelatin The cured films, as shown in Table 1, while self supporting, generally either are not suitable or are marginal for use as a collagen replacement. This is because the wet tensile and percent elongation collectively are well below the values of 0.7 Kg/mm$^2$ and 55% respectively for a commercial collagen. However, the tests do demonstrate certain trends. For example, the addition of gelatin as the third component, improves the wet tensile strength and percent elongation of the film and reduces solution viscosity which is important. The addition of gelatin up to about 10% does not seem to have an effect. Adding 15 to 25% gelatin improves the properties of the ternary polymer whereas 40% (Sample 9) reduces the wet tensile strength by up to one-half or more over samples having less gelatin. It also is clear that as the total solids content increases, the film properties improve.

Attempts were made to increase the solids content but this was not possible due to equipment limitations and particularly the difficulty of dissolution of the konjac using the simple beaker and stirrer system. However, by changing to a Littleford-Day FMC Model 50 Lab mixer with a plough stirring mechanism, it was possible to increase the solids content to 20%. Table II gives the properties of films made at higher solids concentrations.

Additional tests were performed using this lab mixer and generally following the procedure set out above. Once the dry ingredients were dissolved, the contents of the mixture was loaded into the hopper of a Doering Twin Screw extruder feeding a 20.3 cm slot die with a gap width of 0.76 to 1.02 mm preheated to 85 to 90° C.

All films were made using a konjac: agar: gelatin ratio of 48:32:20.

TABLE II

INCREASING SOLIDS CONCENTRATION

| | | | 50% RH | | | Rewet | | |
|---|---|---|---|---|---|---|---|---|
| Sample No. | % Total Solids | Visc. | mils | kg/mm$^2$ | % elong | mils | kg/mm$^2$ | % elong |
| 14* | 4 | 11200 | 1 | 6.2 | 39 | 1.2 | 0.71 | 89 |
| 15 | 10 | (1) | 3 | 6.5 | 50 | 3.5 | 0.82 | 74 |
| 16 | 12 | (1) | 1.3 | 7.5 | 29 | 1.4 | 1.08 | 87 |
| 17 | 20 | (2) | — | (3) | (3) | 14.5 | 0.07 | 79 |

*lab diluted from Sample 15
(1) Smooth thick dough
(2) Thick pasty dough - may be poorly dissolved
(3) Too brittle to test The test results, as shown in Table II, confirm that increasing the solids content to 10% or more provides a stand-alone film having an average wet tensile (MD+TD) /2 and percent elongation properties which meet or exceed those of collagen (0.7 kg/mm$^2$ and 55%) for both wet and dry samples. Sample 17, with 20% solids had poorer properties than Sample 16 with 12% solids. However, this might be due to equipment limitations in that this sample did not appear fully dissolved and gave a granular film on extrusion. The cast gel and the wet film are fragile and should be supported until after curing and drying. As a result, full support of the gel and wet film, up to final drying, is preferred.

These tests demonstrate that with the equipment used, the maximum practical solids content for the edible ternary film of the present invention appears to be about 20%. However, with better mixing techniques, it is speculated that this value may be exceeded. At about 10% solids, the film tensile and elongation properties begin to meet those of a conventional collagen.

The incorporation of gelatin into the konjac:agar mix in amounts of about 10 to less than 40 wt. % contribute to the wet tensile strength of the film. Such wet tensile strength is important for use of the film in meat processing applications.

While the film is a ternary system, a major component is the polysaccharide blend including konjac flour (glucomannan). Accordingly, if the gelatin makes up 10 to 40% of the mixture, then konjac should be at least 50% of the remaining 60 to 90% polysaccharide blend. For example, in each of the samples as set out in Table I and II, the konjac:agar ratios varied from 50:50 to 70:30.

Furthermore, the film properties as described, are obtained without exposing the film to chemical crosslinking agents. This is important as many chemical crosslinkers are not approved for direct food contact.

Accordingly, it should be appreciated that the present invention accomplishes its intended objects in providing a stand-alone edible film having tensile and elongation properties comparable to collagen films.

Having thus described the invention in detail, what is claimed as new is:

1. A self supporting, water insoluble, plasticized edible film comprising:
   a) a solids content of 40 to 70 wt. % composed of a ternary blend of konjac flour, agar and gelatin which is rendered water insoluble by the deacetyation of the konjac wherein
      i) said konjac flour comprises about 42.5 to 60 wt % of said ternary blend and at least 50 wt. % of the total amount of konjac and agar; and
      ii) said gelatin comprising 10 to 40 wt. % of said ternary blend;
   b) said film further containing
      i) 20 to 40 wt. % polyol plasticizer and
      ii) 5 to 12 wt. % water; and
   c) said film having an average rewet machine direction and transverse direction tensile strength of at least 0.7 kg/add.

2. A film as in claim 1 wherein said ternary blend consists essentially of konjac flour, agar and gelatin and said film being plasticized with said polyol and water.

3. A film as in claim 1 wherein said water insoluble film comprises:
   a) 42.5 to 60 wt % konjac flour;
   b) 22 to 42.5 wt % agar; and
   c) 15 to 25 wt % gelatin.

4. A film as in claim 3 wherein said konjac and agar are in the ratio of 50:50 to 70:30.

5. A film as in claim 1 wherein said konjac, agar and gelatin are in the ratio of 48:32:20.

6. A film as in claim 1 wherein said film has a rewet percent elongation at break of at least 55%.

7. A method of forming a water insoluble self supporting film comprising the steps of:
   a) dry blending konjac flour, agar and gelatin;
   b) dissolving the blend in refluxing water to prepare a dough;
   c) casting the dough to a sheet; and then in sequence
   d) drying the sheet to form an uncured film;
   e) contacting the uncured film with a saturated salt solution at a pH other than neutral to deacetylate the konjac flour thereby forming a rehydrated salt-containing and water insoluble film;
   f) drying the salt-containing water insoluble film;
   g) washing the water insoluble film to form a salt-free film;
   h) plasticizing the salt-free film; and
   i) drying the salt-free film to provide a stand-alone film comprising a water insoluble blend of said konjac, agar and gelatin, 20 to 40 wt. % plasticizer and 5 to 12 wt%. water.

8. A method as in claim 7 wherein said dry blending combines 42.5 to 60 wt. % konjac flour, 22 to 42.5 wt. % agar and 15 to 25 wt. % gelatin.

9. A method as in claim 8 wherein said dough has a solids content of 3 to 20 wt. %.

10. A method as in claim 8 wherein said dough has a solids content of 10 to 20 wt. %.

11. A method as in claim 8 wherein said drying the sheet of dough reduces its moisture content to below 7 wt. %.

12. A method as in claim 8 wherein said dry blending of konjac, agar and gelatin is in the ratio of 48:32:20.

13. A method as in claim 7 wherein said salt solution is a saturated solution of NaCl at a high pH.

14. A method as in claim 13 wherein said salt solution contains 26 wt. % NaCl and 0.5 wt. % NaOH.

15. A method as in claim 7 wherein plasticizing said salt-free film comprises contacting said salt-free film with an aqueous glycerin solution.

* * * * *